UNITED STATES PATENT OFFICE.

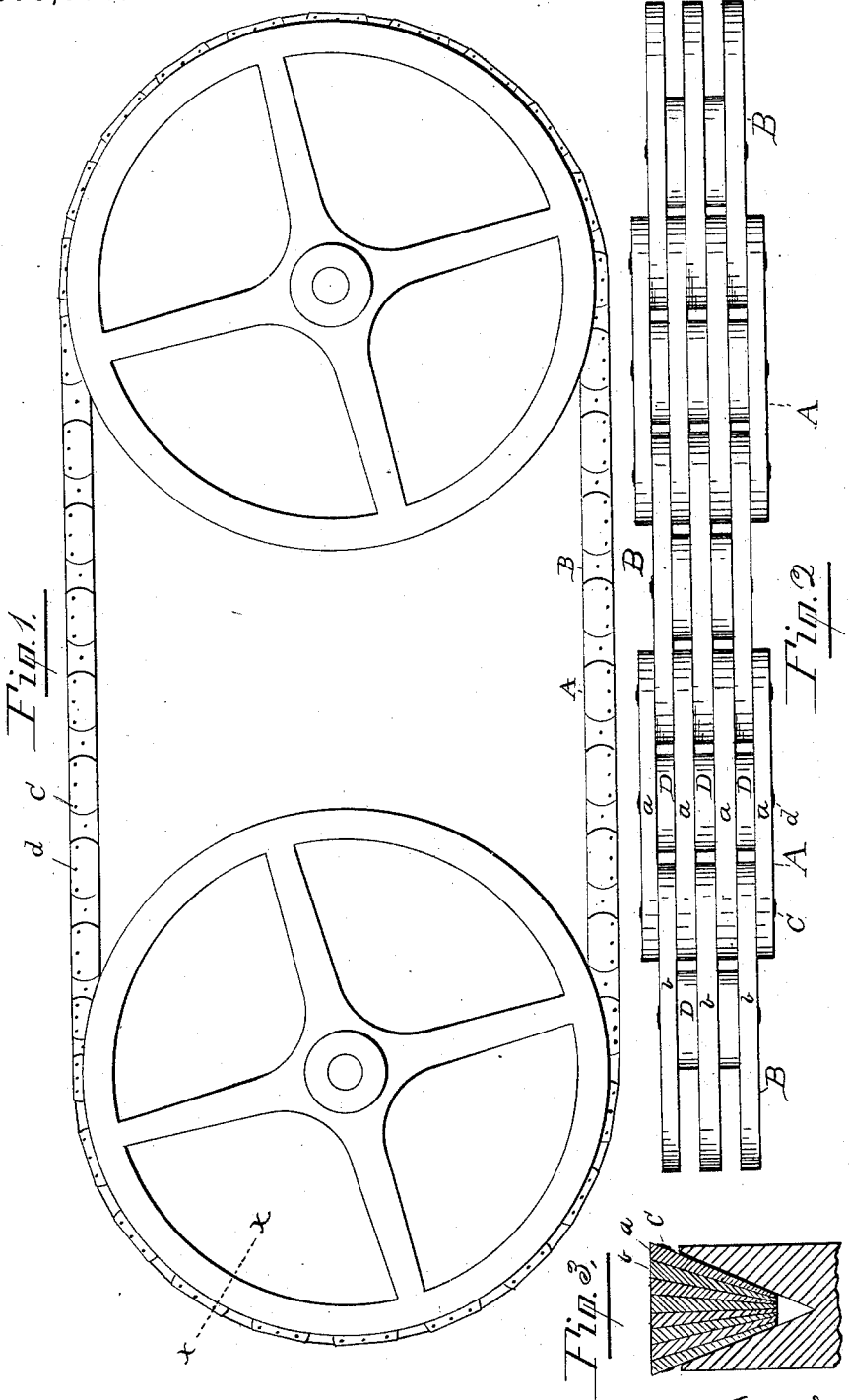

DAVID YOUNG, OF STOCKTON, CALIFORNIA.

LINK BELTING.

SPECIFICATION forming part of Letters Patent No. 375,040, dated December 20, 1887.

Application filed February 11, 1887. Serial No. 227,337. (No model.)

*To all whom it may concern:*

Be it known that I, DAVID YOUNG, a citizen of the United States, residing at Stockton, in the county of San Joaquin, State of California, have invented certain new and useful Improvements in Link V-Belts, of which the following is a specification, reference being had therein to the accompanying drawings.

The object of my invention is to provide a link V-shaped machine-belt. This I accomplish by the use of independent sections suitably connected together.

The invention consists of the peculiar construction of the links and in having each alternate link smaller than its fellow, so that the belt shall bear only at such intervals upon the surface of the pulley; also, in such other devices as will be hereinafter described, and specifically pointed out in the claim.

In the drawings, Figure 1 is a side view of the V-faced pulley carrying the belt. Fig. 2 is an enlarged top view of a piece of the belt. Fig. 3 is a cross-sectional view taken on the line $x$ $x$ in Fig. 2.

I construct my improved V-belt of leather links A, which bear upon the face of the pulley and are composed of ribbons $a$, and of B, the links which connect the links A together, and are composed of the leather ribbons $b$, and do not impinge upon the face of the pulley. The ends of the links are attached together by rivets C. To stiffen the links at their centers I insert between each ribbon leather buttons D, which are held in their places by rivets $d$, passing through each, and also through each ribbon of the links. The drawings show these buttons D in use in the links B; but, if desired, they may be discarded in the links B, because such links merely serve to connect the bearing-links A together, and do not sustain the same pressure and strain as do the links A.

The rivets C, it will be observed, answer the purpose of attaching the ribbons of their respective links together, as well as their primary purpose of attaching the ends of the links to each other. The ribbons of the links are wedge-shaped, so that when united together they form the V shape requisite for use with the V-faced pulleys. This style of belting will be found of great advantage in use where powerful machinery is to be driven, for the reason that it is not possible for it to slip, and the wear is likewise greatly reduced by reason of the alternate sections A only presenting a wearing-surface to the inside of the pulley. The buttons D also impart great solidity to the links A. If from any cause a link becomes injured, it is easily removed and replaced by a fresh link by reason of the simple connection afforded by the rivets C. A single ribbon, $a$ or $b$, if injured, may also be easily removed and replaced.

I am aware that V-shaped belts *per se* are not novel; but

What I claim as being new and of my invention is—

The V-shaped belt herein described, composed of the leather links A, formed of wedge-shaped leather ribbons $a$, separating-buttons D, and links B, formed of wedge-shaped leather ribbons $b$, separating-buttons, and connecting-rivets $d$, substantially as specified.

In testimony whereof I affix my signature in presence of two witnesses.

DAVID YOUNG.

Witnesses:
 J. B. WEBSTER,
 E. BEECHER STOWE.